(12) United States Patent
Utsunomiya et al.

(10) Patent No.: US 11,329,293 B2
(45) Date of Patent: May 10, 2022

(54) GAS DIFFUSION ELECTRODE SUBSTRATE AND METHOD FOR PRODUCING GAS DIFFUSION ELECTRODE SUBSTRATE

(71) Applicant: TORAY INDUSTRIES, INC., Tokyo (JP)

(72) Inventors: Masamichi Utsunomiya, Otsu (JP); Yasuaki Tanimura, Otsu (JP); Toshiya Kamae, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/345,222

(22) Filed: Jun. 11, 2021

(65) Prior Publication Data

US 2021/0305584 A1 Sep. 30, 2021

Related U.S. Application Data

(62) Division of application No. 15/523,890, filed as application No. PCT/JP2015/080570 on Oct. 29, 2015, now abandoned.

(30) Foreign Application Priority Data

Nov. 11, 2014 (JP) .................................. 2014-228574

(51) Int. Cl.
*H01M 4/88* (2006.01)
*H01M 4/96* (2006.01)
(Continued)

(52) U.S. Cl.
CPC ............ *H01M 4/8807* (2013.01); *B05D 1/26* (2013.01); *B05D 7/24* (2013.01); *B32B 5/18* (2013.01);
(Continued)

(58) Field of Classification Search
None
See application file for complete search history.

(56) References Cited

U.S. PATENT DOCUMENTS

| | | |
|---|---|---|
| 2005/0214630 A1 | 9/2005 | Yoshida et al. |
| 2005/0260909 A1 | 11/2005 | Hirahara |

(Continued)

FOREIGN PATENT DOCUMENTS

| | | | |
|---|---|---|---|
| JP | 2006-120335 A | 5/2006 | |
| JP | 2007-075798 * | 3/2007 | ............... B05D 1/26 |

(Continued)

OTHER PUBLICATIONS

Extended European Search Report, dated Mar. 8, 2018, for European Application No. 15859292.3.

(Continued)

*Primary Examiner* — Amanda J Barrow
(74) *Attorney, Agent, or Firm* — Birch, Stewart, Kolasch & Birch, LLP

(57) ABSTRACT

The purpose of the present invention is to provide: a method for producing a gas diffusion electrode base which enables the achievement of a gas diffusion electrode base that has a microporous layer with small surface roughness and is not susceptible to damaging an electrolyte membrane; and a gas diffusion electrode base that has a microporous layer with small surface roughness and is not susceptible to damaging an electrolyte membrane. For the purpose of achieving the above-described purpose, the present invention has the configuration described below. Namely, a specific gas diffusion electrode base which has a carbon sheet and a microporous layer, and wherein the carbon sheet is porous and the DBP oil absorption of a carbon powder contained in the microporous layer is 70-155 ml/100 g.

6 Claims, 1 Drawing Sheet

(51) Int. Cl.
*H01M 8/02* (2016.01)
*B05D 7/24* (2006.01)
*B05D 1/26* (2006.01)
*B32B 9/04* (2006.01)
*B32B 5/18* (2006.01)
*H01M 4/86* (2006.01)
*H01M 8/10* (2016.01)

(52) U.S. Cl.
CPC .............. *B32B 9/04* (2013.01); *H01M 4/86* (2013.01); *H01M 4/88* (2013.01); *H01M 4/8864* (2013.01); *H01M 4/8885* (2013.01); *H01M 4/96* (2013.01); *H01M 8/02* (2013.01); *H01M 8/10* (2013.01); *Y02P 70/50* (2015.11)

(56) References Cited

U.S. PATENT DOCUMENTS

| | | | |
|---|---|---|---|
| 2009/0148739 A1* | 6/2009 | Akasaka | H01M 8/0234 429/410 |
| 2010/0129696 A1 | 5/2010 | Hong et al. | |
| 2011/0046289 A1 | 2/2011 | Zhamu et al. | |
| 2011/0171563 A1 | 7/2011 | Waki et al. | |
| 2011/0229785 A1 | 9/2011 | Song et al. | |
| 2012/0058260 A1* | 3/2012 | Arsten | C03C 17/006 427/162 |
| 2012/0214000 A1* | 8/2012 | Kyrlidis | H01G 11/04 216/81 |
| 2013/0224603 A1 | 8/2013 | Chen et al. | |
| 2013/0252082 A1* | 9/2013 | Thompkins | H01M 4/587 429/188 |
| 2015/0207151 A1 | 7/2015 | Utsunomiya et al. | |
| 2015/0372332 A1 | 12/2015 | Okano et al. | |

FOREIGN PATENT DOCUMENTS

| | | | | |
|---|---|---|---|---|
| JP | 2013-145840 A | | 7/2013 | |
| KR | 10-2009-0030118 A | | 3/2009 | |
| KR | 20090030118 | * | 3/2009 | ............. H01M 4/86 |
| WO | WO 2005/081339 A1 | | 9/2005 | |
| WO | WO 2014/030553 A1 | | 2/2014 | |
| WO | WO 2014/126002 A1 | | 8/2014 | |

OTHER PUBLICATIONS

International Search Report, issued in PCT/JP2015/080570, PCT/SA/210, dated Jan. 26, 2016.
JIS B 0601 Surface Roughness Measurement Method data sheet (date unknown)—evidential reference. Date listed below is year the document was accessed by Examiner. (Year: 2019).
Written Opinion of the International Searching Authority, issued in PCT/JP2015/080570, PCT/ISA/237, dated Jan. 26, 2016.

* cited by examiner

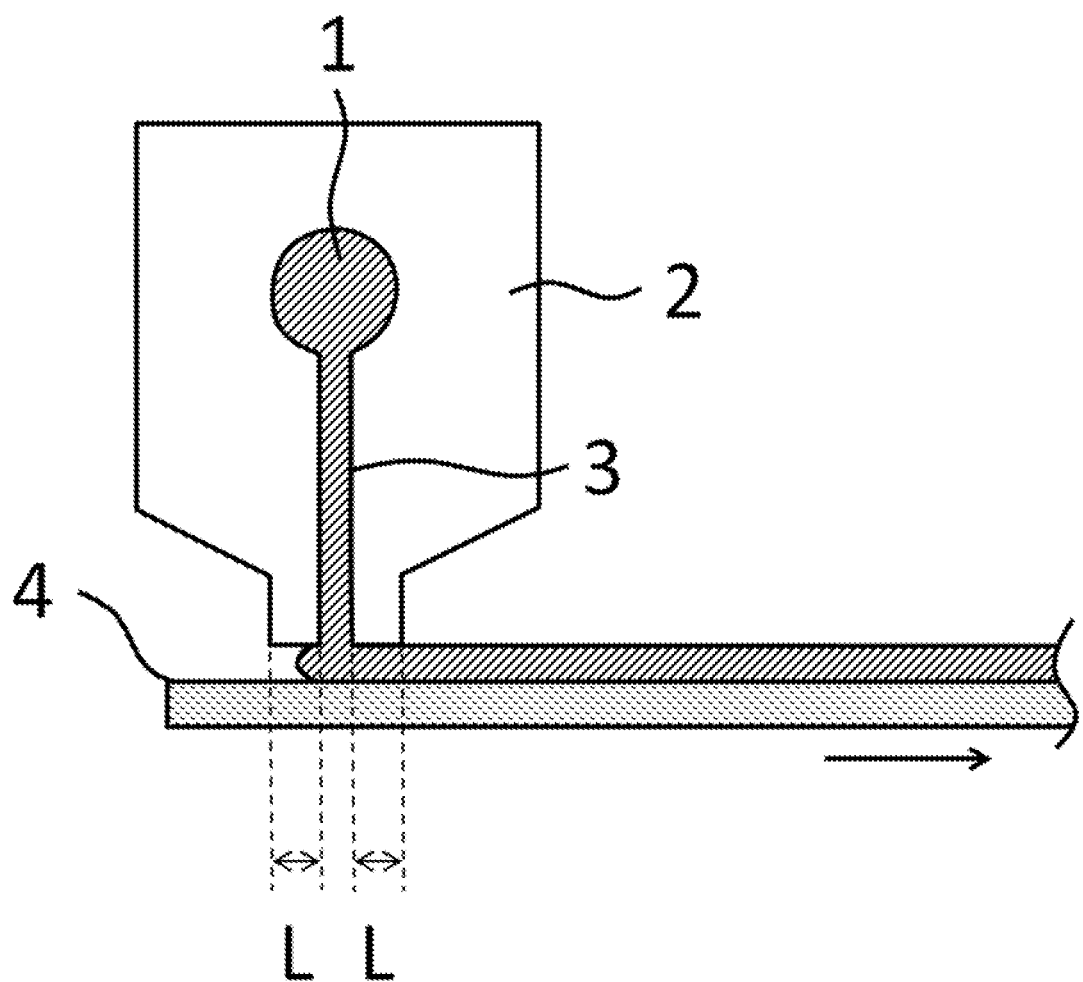

GAS DIFFUSION ELECTRODE SUBSTRATE AND METHOD FOR PRODUCING GAS DIFFUSION ELECTRODE SUBSTRATE

This application is a Divisional of co-pending application Ser. No. 15/523,890, filed on May 2, 2017, which is the National Stage Application under 35 U.S.C. § 371 of International Application No. PCT/JP2015/080570, filed on Oct. 29, 2015, which claims the benefit under 35 U.S.C. § 119(a) to Japanese Patent Application No. 2014-228574, filed on Nov. 11, 2014, all of which are hereby expressly incorporated by reference into the present application.

TECHNICAL FIELD

The present invention relates to a gas diffusion electrode substrate which is suitably used for a fuel cell, particularly for a polymer electrolyte fuel cell and in which a microporous layer is formed on a surface of a carbon sheet; and a method for producing a gas diffusion electrode substrate.

BACKGROUND ART

A polymer electrolyte fuel cell in which a hydrogen-containing fuel gas and an oxygen-containing oxidizing gas are supplied to an anode and a cathode, respectively, and an electromotive force is generated by an electrochemical reaction occurring at both poles is generally constituted by sequentially stacking a bipolar plate, a gas diffusion electrode substrate, a catalyst layer, an electrolyte membrane, a catalyst layer, a gas diffusion electrode substrate, and a bipolar plate. The gas diffusion electrode substrate is required to have high gas diffusivity for allowing a gas supplied from the bipolar plate to be diffused into the catalyst layer and high water removal performance for discharging water generated by the electrochemical reaction to the bipolar plate, as well as high electrical conductivity for extracting generated electric current, and a gas diffusion electrode substrate is widely used in which a microporous layer is formed on a surface of a substrate, or a carbon sheet composed of a carbon fiber and the like.

One of known problems of such a gas diffusion electrode substrate, however, is that the surface roughness of the microporous layer is large to damage an electrolyte membrane in the polymer electrolyte fuel cell, deteriorating the durability of the electrolyte membrane, and many approaches have been made to solve this problem.

For example, Patent Document 1 proposes a microporous layer including a carbon powder small in particle size.

PRIOR ART DOCUMENT

Patent Document

Patent Document 1: WO 2005/081339 A1 SUMMARY OF THE INVENTION

Problem to be Solved by the Invention

In the gas diffusion electrode substrate described in Patent Document 1, the particle size of the carbon powder included in the microporous layer is decreased to reduce the surface roughness of the microporous layer, so that the microporous layer is supposedly less likely to damage an electrolyte membrane to improve the durability of the electrolyte membrane. Patent Document 1 also supposes that a smoother surface, i.e., a surface small in surface roughness can be obtained as the particle size of the carbon powder decreases. The carbon powder small in particle size, however, have not sufficiently reduced the surface roughness of the microporous layer.

The present inventors have considered that when the particle size of the carbon powder included in the microporous layer is small, a coating liquid for forming the microporous layer (hereinafter, also described as an MPL coating liquid) infiltrates into a carbon sheet in an application step of applying the MPL coating liquid onto the carbon sheet (hereinafter, also described as a MPL application step), so that the surface roughness of the microporous layer is not sufficiently reduced. The present inventors have also noticed a problem that the surface roughness is not sufficiently reduced in some cases even when the particle size of the carbon powder is decreased.

An object of the present invention is to provide, in view of the background of such a conventional technique, a method for producing a gas diffusion electrode substrate, the method being capable of giving a gas diffusion electrode substrate whose microporous layer is small in surface roughness to be less likely to damage an electrolyte membrane; and a gas diffusion electrode substrate whose microporous layer is small in surface roughness to be less likely to damage an electrolyte membrane.

Solutions to the Problem

The present inventors have conducted earnest studies repetitively to solve the above problem and focused attention on the secondary particle size of the carbon powder, not the primary particle size of the carbon powder, to reduce the surface roughness of the microporous layer. The present inventors have found that the surface roughness of the microporous layer can be sufficiently reduced by using a carbon powder having a dibutyl phthalate oil absorption (DBP oil absorption), as an index for the secondary particle size, in an appropriate range.

The gas diffusion electrode substrate and the method for producing a gas diffusion electrode substrate according to the present invention include the following configuration.

(1) A gas diffusion electrode substrate including a carbon sheet and a microporous layer, wherein
  the carbon sheet is porous,
  a carbon powder included in the microporous layer has a DBP oil absorption of 70 to 155 ml/100 g,
  the microporous layer has an infiltration index (L/W) of 1.10 to 8.00, the infiltration index being calculated from the areal weight (W) of the microporous layer and the thickness (L) of the microporous layer, and
  the microporous layer has a thickness (L) of 10 to 100 μm.

(2) A gas diffusion electrode substrate including a carbon sheet and a microporous layer, wherein
  the carbon sheet is porous,
  a carbon powder included in the microporous layer has a DBP oil absorption of 70 to 155 ml/100 g, and
  the microporous layer has a surface roughness of 3.0 to 7.0 μm.

(3) A gas diffusion electrode substrate including a carbon sheet and a microporous layer, wherein
  the carbon sheet is porous,
  a carbon powder included in the microporous layer has a DBP oil absorption of 70 to 155 ml/100 g, and
  the gas diffusion electrode substrate has a variety in thickness of 10.0 μm or less.

(4) A method for producing a gas diffusion electrode substrate including a carbon sheet and a microporous layer, wherein the carbon sheet is porous, the method includes an application step of applying a coating liquid for forming the microporous layer (hereinafter, described as an MPL coating liquid) onto at least one surface of the carbon sheet by a slit die coater (hereinafter, described as an MPL application step), the slit die coater has a lip-tip length of 0.10 to 10.00 mm, and the MPL coating liquid contains a carbon powder having a DBP oil absorption of 70 to 155 ml/100 g and an ash content of less than 0.10% by mass, and contains a dispersion medium.

Effects of the Invention

The present invention is a method for producing a gas diffusion electrode substrate, the method being capable of giving a gas diffusion electrode substrate including a microporous layer small in surface roughness and an electrolyte membrane high in durability; and a gas diffusion electrode substrate including a microporous layer small in surface roughness and an electrolyte membrane high in durability.

BRIEF DESCRIPTION OF THE DRAWING

The FIGURE is a schematic sectional view that illustrates one aspect of a slit die coater used for a method for producing a gas diffusion electrode substrate according to the present invention.

MODE FOR CARRYING OUT THE INVENTION

A gas diffusion electrode substrate of the present invention includes a carbon sheet and a microporous layer. In more detail, the gas diffusion electrode substrate of the present invention has the microporous layer formed on at least one surface of the carbon sheet.

First described is the carbon sheet as a constituent of the present invention. It is important that the carbon sheet of the present invention is porous. A porous carbon sheet can achieve both excellent gas diffusivity and excellent water removal performance. For making the carbon sheet porous, a porous material is preferably used as a material used for preparing the carbon sheet.

The carbon sheet in the present invention is required to have high gas diffusivity in an in-plane direction and in a through-plane direction for allowing a gas supplied from a bipolar plate to be diffused into a catalyst and high water removal performance for discharging water generated by an electrochemical reaction to the bipolar plate, as well as high electrical conductivity for extracting generated electric current.

Therefore, preferably used as the carbon sheet is a carbon fiber-containing porous material such as carbon fiber woven fabric, carbon fiber non-woven fabric, or a carbon fiber papermaking substrate because of its excellent corrosion resistance, and especially, a carbon sheet having a carbon fiber papermaking substrate bonded with carbide, namely "carbon paper," is preferably used because of its excellent mechanical strength. Additionally, "carbon cloth" as the carbon fiber woven fabric or felt-type carbon non-woven fabric as the carbon fiber non-woven fabric can also be used as the carbon sheet.

Hereinafter, a case of using the carbon fiber papermaking substrate is described as a representative example.

In the present invention, a carbon sheet having a carbon fiber papermaking substrate bonded with carbide can normally be obtained by impregnating a carbon fiber papermaking substrate with a resin and carbonizing the resulting substrate, as described below.

Examples of the carbon fiber include polyacrylonitrile (PAN)-based, pitch-based and rayon-based carbon fibers. Especially, a PAN-based or pitch-based carbon fiber is preferably used in the present invention because of its excellent mechanical strength.

The carbon fiber in the present invention has a mean diameter of monofilaments preferably in the range of 3 to 20 $\mu$m and more preferably in the range of 5 to 10 $\mu$m. A mean diameter of 3 $\mu$m or more, more preferably 5 $\mu$m increases the pore size of the carbon sheet to improve the water removal performance, so that flooding can be suppressed. Meanwhile, the mean diameter is preferably 20 $\mu$m or less and more preferably 10 $\mu$m. The use of a carbon sheet having such a mean diameter decreases the diffusivity of water vapor to improve cell performance at a high temperature. The flooding refers to a phenomenon that the carbon sheet is clogged with a large amount of water generated when a fuel cell, particularly a polymer electrolyte fuel cell is operated in a high current density region. When such a phenomenon occurs during the operation of a fuel cell, the supply of a fuel gas becomes insufficient to cause a problem of deteriorating the cell performance.

Here, the mean diameter of monofilaments in the carbon fiber is determined by taking a photograph of carbon fibers at a magnification of 1000 times under a microscope such as a scanning electron microscope, randomly selecting 30 different monofilaments, measuring their diameters, and deriving the average value of their diameters. As the scanning electron microscope, S-4800 manufactured by Hitachi, Ltd. or its equivalent product can be used.

The carbon fiber in the present invention has a mean length of monofilaments preferably in the range of 3 to 20 mm and more preferably in the range of 5 to 15 mm. A mean length of 3 mm or more, more preferably 5 mm or more preferably makes the carbon sheet excellent in mechanical strength, electrical conductivity, and thermal conductivity. Meanwhile, a mean length of 20 mm or less, more preferably 15 mm or less makes the dispersibility of carbon fibers during paper making excellent to preferably give a uniform carbon sheet. A carbon fiber having such a mean length can be obtained by a method of cutting a continuous carbon fiber into a desired length, or the like.

Here, the mean length of the carbon fiber is determined by taking a photograph of carbon fibers at a magnification of 50 times under a microscope such as a scanning electron microscope, randomly selecting 30 different monofilaments, measuring their lengths, and deriving the average value of their lengths. As the scanning electron microscope, S-4800 manufactured by Hitachi, Ltd. or its equivalent product can be used. Although the mean diameter and the mean length of monofilaments in the carbon fiber are normally measured by directly observing a carbon fiber as a raw material, it may also be measured by observing the carbon sheet.

In the present invention, the carbon sheet is preferably low in areal weight, having an areal weight in the range of 20 to 75 g/m$^2$. The carbon sheet has an areal weight of preferably 70 g/m$^2$ or less and more preferably 65 g/m$^2$ or less. The carbon sheet also has an areal weight of preferably 25 g/m$^2$ or more and more preferably 30 g/m$^2$ or more. A carbon sheet having an areal weight of 20 g/m$^2$ or more, more preferably 25 g/m² or more, further preferably 30 g/m² or more is further improved in electrical conductivity to more increase the electrical conductivity of the gas diffusion electrode substrate including the carbon sheet, so that the cell performance is further improved at both high and low temperatures. Further, the mechanical strength of the carbon sheet can be further improved to more preferably support an electrolyte membrane and a catalyst layer. Meanwhile, a carbon sheet having an areal weight of 75 g/m² or less, more preferably 70 g/m² or less, further preferably 65 g/m² or less increases the gas diffusivity in the through-plane direction of a resultant gas diffusion electrode substrate to further improve the cell performance at both high and low temperatures.

The carbon sheet having such an areal weight can be obtained by controlling the areal weight of the carbon fiber in a prepreg and the addition amount of a resin component based on the carbon fiber, in the production method described below. In the present invention, described as the "prepreg" is one obtained by impregnating, for example, a carbon fiber-containing papermaking substrate with a resin composition to be a binder material. In the present invention, the binder material represents a component other than the carbon fiber in the carbon sheet. The binder material includes a resin composition and/or carbide thereof as a material that acts for bonding carbon fibers. When a hydrophobic material is used for the carbon sheet, the hydrophobic material is included in the binder material. In the present invention, the "resin composition" represents, for convenience, a resin composition, a resin composition and carbide thereof, or carbide of a resin composition. The carbide of a resin composition is one obtained by carbonizing a resin component in the resin composition. Here, a carbon sheet having a low areal weight can be obtained by decreasing the areal weight of the carbon fiber in a prepreg, and a carbon sheet having a high areal weight can be obtained by increasing the areal weight of the carbon fiber. A carbon sheet having a low areal weight can also be obtained by decreasing the addition amount of a resin component based on the carbon fiber, and a carbon sheet having a high areal weight can also be obtained by increasing the addition amount of a resin component. In the present invention, the areal weight means the mass per unit area.

Here, the areal weight of the carbon sheet can be obtained by dividing the mass of the carbon sheet weighed using an electronic balance by the area of the carbon sheet.

In the present invention, the upper limit of the thickness of the carbon sheet is preferably 200 μm, more preferably 160 μm, and further preferably 140 μm. The lower limit of the thickness of the carbon sheet is preferably 50 μm, more preferably 60 μm, and further preferably 70 μm. A carbon sheet having a thickness of 50 μm or more, more preferably 60 μm or more, further preferably 70 μm or more makes the gas diffusion in the in-plane direction more preferable and further facilitates the supply of a gas to a catalyst under ribs of a bipolar plate, so that the cell performance is further improved at both high and low temperatures. Further, the mechanical strength of the carbon sheet can be further improved to more preferably support an electrolyte membrane and a catalyst layer. Meanwhile, a carbon sheet having a thickness of 200 μm or less, more preferably 160 μm or less, further preferably 140 μm or less allows the water removal path to be shortened to further improve the water removal performance, more suppressing the flooding, and also allows the electrical conductive path to be shortened to further improve the electrical conductivity, more improving the cell performance at both high and low temperatures.

The carbon sheet having such a thickness can be obtained by controlling the thickness during annealing, in the production method described below. Here, the thickness of the carbon sheet can be determined using a micrometer in a state of compressing the carbon sheet at a surface pressure of 0.15 MPa.

In the gas diffusion electrode substrate of the present invention, it is preferred that one surface of the carbon sheet have a covering rate of 70 to 90%, the other surface have a covering rate lower than the covering rate of the one surface by 5 to 20 points, and the microporous layer be on a side of the one surface of the carbon sheet. Here, the phrase "the other surface has a covering rate lower than the covering rate of the one surface by 5 to 20 points" means that the difference in the covering rate determined between one surface having a larger covering rate and the other surface having a smaller covering rate is 5 to 20 points. In the present invention, the one surface of the carbon sheet (surface having a larger covering rate) preferably has the microporous layer thereon. The gas diffusion electrode substrate including the microporous layer on the one surface (surface having a larger covering rate) of the carbon sheet can be obtained by a method of applying an MPL coating liquid onto the one surface (surface having a larger covering rate) of the carbon sheet.

Here, the covering rate is represented by the proportion of a portion whose surface is covered with the carbon fiber and the binder material (portion where the carbon fiber and the binder material are present), to the whole surface (whole combined surface of an empty portion and a portion where the carbon fiber and the binder material are present) of the carbon sheet. The covering rate can be determined by numerically processing an image obtained by observing the surface of the carbon sheet under a scanning electron microscope. That is, the covering rate can be obtained by separating the empty portion on the surface from the portion where the carbon fiber and the binder material are present and determining the area ratio between the portions.

The covering rate is measured in the following procedure.

First, a surface of the carbon sheet is imaged at a magnification of 50 times under a scanning electron microscope (S4800 manufactured by Hitachi, Ltd.) while the light-dark contrast is adjusted by an accompanying automated adjusting function. Next, using the image processing program "J-trim," the obtained image is sectioned, by brightness, into 256 grades between the maximum and minimum lightness, and binarized with the 70th grade from the minimum as a threshold. The proportion of an area binarized to the light side to the whole area is defined as the covering rate [%]. It is possible to separate the carbon sheet from the gas diffusion electrode substrate and measure the covering rate of the carbon sheet. For example, the gas diffusion electrode substrate is heated in the atmosphere at 600° C. for 30 minutes, a fluororesin included in the microporous layer of the gas diffusion electrode substrate is oxidatively decomposed, and then, a ultrasonic treatment is carried out in ethanol, whereby it is possible to take out the carbon sheet.

In the present invention, the other surface of the carbon sheet has a smaller covering rate than the covering rate of the one surface of the carbon sheet to allow liquid water in the carbon sheet to move from a side of the one surface having a larger covering rate to a side of the other surface having a smaller covering rate, so that liquid water can be efficiently discharged from the carbon sheet to a bipolar plate. Such a configuration not only improves the water removal performance but also the gas diffusivity because the inside of the carbon sheet is never clogged with water. Therefore, the cell performance is improved in a high current density region that causes a large amount of water.

Accordingly, there is desirably a certain difference in the covering rate between both surfaces of the carbon sheet, and the difference in the covering rate between both surfaces of the carbon sheet is preferably 5 points or more. Meanwhile, an excessively large difference in the covering rate between both surfaces of the carbon sheet is likely to cause insufficient mechanical strength of the carbon sheet.

Therefore, the difference in the covering rate is preferably 20 points or less. Further, in consideration of the balance between efficient water removal performance and efficient gas diffusivity, the difference in the covering rate is more preferably 6.5 points or more and 15.0 points or less and further preferably 7.5 points or more and 12.0 points or less.

A carbon sheet having a covering rate of 70% or more on a surface on which the microporous layer is provided makes the MPL coating liquid less likely to infiltrate into the carbon sheet in an MPL application step described below, reducing the surface roughness of the microporous layer. Meanwhile, a carbon sheet having a covering rate of 90% or less on a surface on which the microporous layer is provided further improves the gas diffusivity in the through-plane direction of the carbon sheet to increase the gas diffusivity in the through-plane direction of the gas diffusion electrode substrate, further improving the cell performance at both high and low temperatures. Further, in consideration of the balance between efficient water removal performance and efficient gas diffusivity, the one surface of the carbon sheet preferably has a covering rate of 75.0% or more and 81.4% or less.

The gas diffusion electrode substrate of the present invention includes the carbon sheet and the microporous layer. That is, in the gas diffusion electrode substrate of the present invention, the microporous layer is provided on at least one surface of the carbon sheet. The microporous layer is required to have high gas diffusivity in the through-plane direction for allowing a gas supplied from a bipolar plate to be diffused into a catalyst and high water removal performance for discharging water generated by an electrochemical reaction to the bipolar plate, as well as high electrical conductivity for extracting generated electric current. Furthermore, the microporous layer also has a function of promoting back-diffusion of moisture to an electrolyte membrane to wet the electrolyte membrane.

In the present invention, the microporous layer includes a carbon powder and is porous from the viewpoint of improving the electrical conductivity and the water removal performance. In order to improve the electrical conductivity and the water removal performance, a linear carbon and a fluororesin can be used as the carbon powder and the hydrophobic material, respectively. In the present invention, the microporous layer more preferably includes a hydrophobic material.

In the present invention, the microporous layer preferably has an areal weight in the range of 10 to 35 $g/m^2$. The microporous layer has an areal weight of more preferably 30 $g/m^2$ or less and further preferably 25 $g/m^2$ or less. The microporous layer also has an areal weight of more preferably 12 $g/m^2$ or more and further preferably 14 $g/m^2$ or more. A microporous layer having an areal weight of 10 $g/m^2$ or more, more preferably 12 $g/m^2$ or more, further preferably 14 $g/m^2$ or more can more cover the surface of the carbon sheet to more promote back-diffusion of generated water, so that dry-out of an electrolyte membrane can be suppressed. In addition, a microporous layer having an areal weight of 35 $g/m^2$ or less, more preferably 30 $g/m^2$ or less, further preferably 25 $g/m^2$ or less improves the water removal performance, so that the flooding can be more suppressed.

In the present invention, examples of the carbon powder contained in the microporous layer or the MPL coating liquid include carbon powders of carbon black such as furnace black, acetylene black, lamp black, and thermal black; graphite such as flaky graphite, scaly graphite, earthy graphite, artificial graphite, expanded graphite, and flake graphite; and CNT. Especially, carbon black is more preferably used, and acetylene black is most preferably used because of its less impurities.

In the present invention, when the carbon powder included in the microporous layer or the MPL coating liquid is a linear carbon, the linear carbon preferably has an aspect ratio of 30 to 5000. A linear carbon having an aspect ratio in the above range appropriately suppresses the infiltration of a filler-containing coating liquid, or a precursor of the microporous layer, into the carbon sheet to improve the gas diffusivity in the in-plane direction and the water removal performance, so that the flooding can be suppressed. Furthermore, the microporous layer is formed on a front layer of the carbon sheet so as to have a sufficient thickness, to promote back-diffusion of generated water, so that dry-out of an electrolyte membrane can be suppressed.

In the present invention, the microporous layer preferably includes a hydrophobic material from the viewpoint of promoting the removal of liquid water. Especially, a fluorinated polymer is preferably used as the hydrophobic material because of its excellent corrosion resistance. Examples of the fluorinated polymer include polytetrafluoroethylene (PTFE), a tetrafluoroethylene-hexa fluoro propylene copolymer (FEP), and a tetrafluoroethylene-perfluoroalkylvinyl ether copolymer (PFA). Especially, FEP is more preferable whose viscosity in a molten state is lower than the viscosity of PTFE and which has thus less deviation of a fluororesin.

In the present invention, the gas diffusion electrode substrate preferably has a thickness in the range of 70 to 230 μm. The gas diffusion electrode substrate has a thickness of more preferably 190 μm or less and further preferably 170 μm or less. The gas diffusion electrode substrate also has a thickness of preferably 70 μm or more, more preferably 80 μm or more, and further preferably 90 μm or more. A gas diffusion electrode substrate having a thickness of 70 μm or more, more preferably 80 μm or more, further preferably 90 μm or more improves the gas diffusivity in the in-plane direction and further facilitates the supply of a gas to a catalyst under ribs of a bipolar plate, so that the cell performance is further improved at both high and low temperatures. Meanwhile, a gas diffusion electrode substrate having a thickness of 230 μm or less, more preferably 190 μm or less, further preferably 170 μm or less further improves the water removal performance to more suppress the flooding, and allows the electrical conductive path to be more shortened to further improve the electrical conductivity, more improving the cell performance at both high and low temperatures. The gas diffusion electrode substrate having such a thickness can be obtained by controlling the thickness of the carbon sheet and the thickness of the microporous layer.

Here, the thickness of the gas diffusion electrode substrate can be determined using a micrometer in a state of compressing the gas diffusion electrode substrate at a surface pressure of 0.15 MPa.

In one aspect of the gas diffusion electrode substrate of the present invention, the infiltration index (L/W) is in the range of 1.10 to 8.00 that is calculated from the areal weight (W) of the microporous layer and the thickness (L) of the microporous layer, and the thickness (L) of the microporous layer is in the range of 10 to 100 µm. The infiltration index is more preferably 1.20 or more and further preferably 1.40 or more. The infiltration index is also more preferably 7.00 or less and further preferably 6.00 or less. When the areal weight (W) of the microporous layer is small and the thickness (L) of the microporous layer is large, that is, when the infiltration of the MPL coating liquid into the carbon sheet is small, the infiltration index (L/W) increases. An infiltration index (L/W) of 1.10 or more, more preferably 1.20 or more, further preferably 1.40 or more gives a gas diffusion electrode substrate small in infiltration of the MPL coating liquid into the carbon sheet, high in gas diffusivity, and high in cell performance. An infiltration index (L/W) of 8.00 or less, more preferably 7.00 or less, further preferably 6.00 or less gives the microporous layer a dense structure to reduce the surface roughness of the gas diffusion electrode substrate, so that an electrolyte membrane is less likely to be damaged, improving the durability of a fuel cell. The thickness (L) of the microporous layer is more preferably 15 µm or more and further preferably 20 µm or more. The thickness (L) of the microporous layer is also more preferably 90 µm or less and further preferably 80 µm or less. A microporous layer having a thickness (L) of 10 µm or more, more preferably 15 µm or more, further preferably 20 µm or more makes the carbon sheet less likely to damage an electrolyte membrane, so that the durability of a fuel cell is improved. A microporous layer having a thickness (L) of 100 µm or less, more preferably 90 µm or less, further preferably 80 µm or less increases the gas diffusivity of the gas diffusion electrode substrate to improve the cell performance. The gas diffusion electrode substrate having an infiltration index and a thickness as described above can be obtained by the production method described below.

In one aspect of the gas diffusion electrode substrate of the present invention, the microporous layer preferably has a surface roughness of 3.0 to 7.0 µm. More preferable upper and lower limits and the like of the surface roughness of the microporous layer in the present aspect are similar to more preferable upper and lower limits and the like in another aspect described below.

In one aspect of the gas diffusion electrode substrate of the present invention, the gas diffusion electrode substrate preferably has a variety in thickness of 10.0 µm or less. A more preferable upper limit and the like of the variety in thickness of the gas diffusion electrode substrate in the present aspect are similar to a more preferable upper limit and the like in still another aspect described below.

In the one other aspect of the gas diffusion electrode substrate of the present invention, the microporous layer has a surface roughness of 3.0 to 7.0 µm. The microporous layer has a surface roughness of more preferably 6.0 µm or less and further preferably 5.0 µm or less. A microporous layer having a surface roughness of 7.0 µm or less, more preferably 6.0 µm or less, further preferably 5.0 µm or less is less likely to damage an electrolyte membrane to improve the durability of a fuel cell. The gas diffusion electrode substrate having a surface roughness as described above can be obtained by the production method described below.

In the gas diffusion electrode substrate of the present invention, the size (peak size) of a pore having a pore size in the range of 0.03 to 1.00 in and a maximum volume is preferably in the range of 0.10 to 1.00 µm and more preferably in the range of 0.10 to 0.80 µm. A peak size in the range of 0.10 to 1.00 µm, more preferably in the range of 0.10 to 0.80 µm can more effectively suppress the flooding.

In the still other aspect of the gas diffusion electrode substrate of the present invention, the gas diffusion electrode substrate has a variety in thickness of 10.0 µm or less. The gas diffusion electrode substrate has a variety in thickness of more preferably 9.0 µM or less and further preferably 8.0 µm or less. A gas diffusion electrode substrate having a variety in thickness of 10.0 µm or less, more preferably 9.0 µm or less, further preferably 8.0 µm or less reduces the surface roughness of the gas diffusion electrode substrate and is less likely to damage an electrolyte membrane to improve the durability of a fuel cell. Here, the variety in thickness of the gas diffusion electrode substrate can be determined using a micrometer in a state of compressing the gas diffusion electrode substrate at a surface pressure of 0.15 MPa. The gas diffusion electrode substrate having a variety in thickness as described above can be obtained by the production method described below. Although the variety in thickness does not particularly have a lower limit, it is normally 1 µm or more.

The gas diffusion electrode substrate having a peak size in the range of 0.10 to 1.00 µm can be obtained by controlling the primary particles size and the state of dispersion of the carbon powder.

Here, a pore size distribution of the gas diffusion electrode substrate (distribution of the volume of a pore with respect to the size of the pore) has been obtained by mercury intrusion technique. Three test pieces each in a rectangle of about 12 mm×20 mm have been cut out from the gas diffusion electrode substrate, precisely weighed, and placed in a measurement cell so as not to be piled, and mercury has been injected under reduced pressure. Then, the measurement has been conducted under the following conditions.

Measurement pressure range: Pressure at start of measurement 6 kPa (pore size 400 µm) to pressure at end of measurement 414 MPa (pore size 30 nm)
    Measurement cell mode: Pressurization process in the above pressure range
    Cell volume: 5 cm$^3$
    Surface tension of mercury: 485 dyn/cm
    Contact angle of mercury: 130°

As the measurement apparatus, AutoPore 9520 manufactured by Shimadzu Corporation or its equivalent product can be used.

The size (peak size) of a pore having a pore size in the range of 0.03 to 1.00 µm and a maximum volume has been also determined from the pore size distribution.

A method for producing a gas diffusion electrode substrate according to the present invention is a method for producing a gas diffusion electrode substrate including a carbon sheet and a microporous layer, the carbon sheet being porous, the method including an application step of applying a coating liquid for forming the microporous layer onto at least one surface of the carbon sheet by a slit die coater, the slit die coater having a lip-tip length of 0.10 to 10.00 mm, and the MPL coating liquid containing a carbon powder that has a DBP oil absorption of 70 to 155 ml/100 g and an ash content of less than 0.10% by mass, and containing a dispersion medium.

Hereinafter, the method for producing a gas diffusion electrode substrate according to the present invention is specifically described with reference to an example of using, as the carbon sheet, a carbon fiber baked substrate obtained from a carbon fiber papermaking substrate.

<Papermaking Substrate and Production Method of Papermaking Substrate>

In order to obtain a carbon fiber-containing papermaking substrate, employed is, for example, a wet papermaking method in which a carbon fiber-containing papermaking substrate is produced by dispersing carbon fibers in a liquid, a dry papermaking method in which a carbon fiber-containing papermaking substrate is produced by dispersing carbon fibers in the air. Especially, a wet papermaking method is preferably employed because of its excellent productivity.

For the purpose of improving the water removal performance and the gas diffusivity in the in-plane direction of the carbon sheet, carbon fibers can be mixed with an organic fiber to make paper. As the organic fiber, there can be used a polyethylene fiber, a vinylon fiber, a polyacetal fiber, a polyester fiber, a polyamide fiber, a rayon fiber, an acetate fiber, or the like.

Further, for the purpose of improving the shape-retaining property and ease of handling of the papermaking substrate, an organic polymer can be incorporated as a binder. Here, as the organic polymer, there can be used polyvinyl alcohol, polyvinyl acetate, polyacrylonitrile, cellulose, or the like.

For the purpose of maintaining the in-plane electrical conductivity and thermal conductivity to be isotropic, the papermaking substrate is preferably in the form of a sheet in which carbon fibers are randomly dispersed in a two-dimensional plane.

Although the pore size distribution obtained for the papermaking substrate is influenced by the content rate and the dispersion state of carbon fibers, pores can be formed generally at a size of about 20 to 500 µm.

In the papermaking substrate, the areal weight of the carbon fiber is preferably in the range of 10 to 45 $g/m^2$, more preferably in the range of 15 to 40 $g/m^2$, and further preferably in the range of 20 to 35 $g/m^2$. An areal weight of the carbon fiber of 10 $g/m^2$ or more, more preferably 15 $g/m^2$ or more, further preferably 20 $g/m^2$ or more preferably makes the carbon sheet excellent in mechanical strength. An areal weight of the carbon fiber of 45 $g/m^2$ or less, more preferably 40 $g/m^2$ or less, further preferably 35 $g/m^2$ or less preferably makes the carbon sheet excellent in gas diffusivity in the through-plane direction and water removal performance. In a case of laminating a plurality of papermaking substrates, the areal weight of the carbon fiber after the lamination is preferably in the above ranges.

Here, the areal weight of the carbon fiber in the carbon sheet can be determined by retaining a papermaking substrate cut in a 10-cm square in an electric furnace under a nitrogen atmosphere at a temperature of 450° C. for 15 minutes and dividing the weight of the residue obtained by removal of organic matters by the area of the papermaking substrate (0.01 $m^2$).

<Impregnation with Resin Composition>

As a method for impregnating a carbon fiber-containing papermaking substrate with a resin composition, there can be employed a method of dipping a papermaking substrate into a resin composition, a method of applying a resin composition onto a papermaking substrate, a method of laminating and transferring a film composed of a resin composition onto a papermaking substrate, or the like. Especially, a method of dipping a papermaking substrate into a resin composition is preferably employed because of its excellent productivity.

In the present invention, a preferable aspect is that the covering rate of one surface of the carbon sheet by a carbon fiber and a binder material be different from the covering rate of the other surface by a carbon fiber and a binder material. This configuration can be obtained by distributing more resin composition, which is to be the binder material on the carbon sheet, to one surface of a porous material when the porous material is impregnated with the resin composition.

By entirely uniformly impregnating a porous material such as a carbon fiber-containing papermaking substrate with a resin composition by, for example, dipping and then, removing an excessively loaded resin composition from one surface of the porous material before drying, the amount of the resin composition on the front and rear surfaces of a prepreg can be controlled, so that the value of the covering rate on one surface of a resultant carbon sheet can be controlled to be different from the value of the other surface.

As one example, by dipping a carbon fiber papermaking substrate into a resin composition-containing solution, and then, drawing the resin composition-containing solution out of one surface of the carbon fiber papermaking substrate before drying or bringing a squeeze roll into contact with only one surface of the carbon fiber papermaking substrate before drying, the loading amount of the resin composition in the vicinity of one surface of the carbon fiber papermaking substrate can be reduced, compared to the loading amount of the resin composition in the vicinity of the other surface.

As another example, also by dipping a carbon fiber papermaking substrate into a resin composition-containing solution and then, additionally applying a resin composition onto only one surface of the carbon fiber papermaking substrate by spraying or a gravure roll, the value of the covering rate on one surface of the carbon sheet can be controlled to be different from the value of the other surface.

As still another example, during drying after a carbon fiber papermaking substrate is dipped into a resin composition-containing solution, by loading the resin composition to one surface of the carbon fiber papermaking substrate more by gravity on the resin composition and hot-air drying from the one surface, the value of the covering rate on one surface of the carbon sheet can be controlled to be different from the value of the other surface.

In any of the above cases, by entirely incorporating the resin composition into the carbon fiber papermaking substrate, an excessive difference in the covering rate on the front and rear surfaces of the carbon sheet can be suppressed, so that excellent entire binding is obtained and gas diffusivity becomes excellent.

The resin composition used for preparing a prepreg is preferably a resin composition that is carbonized during baking to be an electrically conductive carbide as a binder. Here, the resin composition refers to one obtained by adding, for example, a solvent to a resin component as required. The "resin component" is one that contains a resin such as a thermosetting resin and, as required, an additive(s) such as a carbon powder and a surfactant.

More in detail, the carbonization yield of the resin component contained in the resin composition is preferably 40% by mass or more. A carbonization yield of 40% by mass or more preferably makes the carbon sheet excellent in mechanical characteristics, electrical conductivity, and thermal conductivity. Although the carbonization yield does not particularly have an upper limit, it is normally about 60% by mass.

In the present invention, examples of the resin constituting the resin component in the resin composition used to prepare a prepreg includes thermosetting resins such as a phenolic resin, an epoxy resin, a melamine resin, and a furan resin. Especially, a phenolic resin is preferably used because of its high carbonization yield. In addition, the resin composition can also be used as a binder material without carbonizing the resin composition, and there can be used thermoplastic resins such as a fluororesin, an ABS resin, a polyethylene resin, an acrylic resin, a nylon resin, a polypropylene resin, a polyethylene terephthalate resin, or a urethane resin.

As the additive(s) added, as required, as the resin component in the resin composition used to prepare a prepreg, a carbon powder can be used for the purpose of improving the mechanical characteristics, the electrical conductivity, and the thermal conductivity of the carbon sheet. Here, as the carbon powder, there can be used carbon black such as furnace black, acetylene black, lamp black, and thermal black; graphite such as flaky graphite, scaly graphite, earthy graphite, artificial graphite, expanded graphite, and flake graphite; a carbon nanotube; a carbon nanofiber; a milled fiber of a carbon fiber; or the like.

As the resin composition used to prepare a prepreg, the resin components described above can be used as they are and can also be incorporated into various solvents, as required, for the purpose of enhancing the impregnation property of the resin composition into a porous material such as a carbon fiber papermaking substrate. Here, as the solvent, there can be used methanol, ethanol, isopropyl alcohol, or the like.

The resin composition used to prepare a prepreg is preferably in a liquid form at a temperature of 25° C. and in a state of 0.1 MPa. A liquid resin composition is excellent in the impregnation property into a papermaking substrate to make a resultant carbon sheet excellent in mechanical characteristics, electrical conductivity, and thermal conductivity.

In the present invention, the resin component is impregnated in an amount of preferably 30 to 400 parts by mass and more preferably 50 to 300 parts by mass relative to 100 parts by mass of the carbon fiber in a prepreg. An amount of the impregnated resin component of 30 parts by mass or more relative to 100 parts by mass of the carbon fiber in a prepreg makes the carbon sheet excellent in mechanical characteristics, electrical conductivity, and thermal conductivity. Meanwhile, an amount of the impregnated resin component of 400 parts by mass or less makes the carbon sheet excellent in gas diffusivity in the in-plane direction and in the through-plane direction.

<Lamination and Annealing>

A carbon fiber-containing papermaking substrate is impregnated with a resin composition to prepare a prepreg and then, prepregs can be laminated or a prepreg can be subjected to annealing prior to carbonization.

For the purpose of making the carbon sheet have a prescribed thickness, a plurality of prepregs can be laminated. In this case, a plurality of prepregs having the same property can be laminated, or a plurality of prepregs having different properties can be laminated. Specifically, it is possible to laminate a plurality of prepregs that are different in terms of, for example, the mean diameter and the mean length of the carbon fiber, the areal weight of the carbon fiber in the papermaking substrate, or the amount of the impregnated resin component.

For the purpose of increasing the viscosity of the resin composition or partially cross-linking the resin composition, the prepreg can be subjected to annealing. As an annealing method, there can be employed a method of blowing hot air against the prepreg, a method of heating the prepreg by sandwiching it between hot platens of, for example, a press apparatus, a method of heating the prepreg by sandwiching it between continuous belts, or the like.

<Carbonization>

After impregnating a carbon fiber-containing papermaking substrate with the resin composition, the resulting papermaking substrate is baked in an inert atmosphere to perform carbonization. For this baking, a batch-type heating furnace or a continuous heating furnace can be used. The inert atmosphere can be obtained by allowing an inert gas such as a nitrogen gas or an argon gas to flow in the furnace.

In the present invention, the highest temperature in the baking is preferably in the range of 1300 to 3000° C., more preferably in the range of 1700 to 3000° C., and further preferably in the range of 1900 to 3000° C. A highest temperature of 1300° C. or more proceeds carbonization of the resin component to preferably make the carbon sheet excellent in electrical conductivity and thermal conductivity. Meanwhile, a highest temperature of 3000° C. or less preferably reduces the operating cost of a heating furnace.

In the present invention, a "carbon fiber baked substrate" refers to one obtained by impregnating a carbon fiber-containing papermaking substrate with the resin composition and then carbonizing the resulting papermaking substrate.

<Hydrophobic Treatment>

For the purpose of improving the water removal performance, the carbon fiber baked substrate may be subjected to a hydrophobic treatment.

The hydrophobic treatment can be performed by applying a fluororesin onto the carbon fiber baked substrate and annealing the resulting baked substrate. Here, examples of the fluororesin include polytetrafluoroethylene (PTFE), a tetrafluoroethylene-hexa fluoro propylene copolymer (FEP), and a tetrafluoroethylene-perfluoroalkylvinylether copolymer (PFA). The application amount of the fluororesin is preferably 1 to 50 parts by mass and more preferably 3 to 40 parts by mass relative to 100 parts by mass of the carbon fiber baked substrate. An application amount of the fluororesin of 1 part by mass or more preferably makes the carbon sheet excellent in water removal performance. Meanwhile, an application amount of the fluororesin of 50 parts by mass or less preferably makes the carbon sheet excellent in electrical conductivity. The carbon fiber baked substrate is, after the application of the fluororesin, preferably subjected to drying at 90° C. or more and less than 200° C.

The carbon fiber baked substrate corresponds to the "carbon sheet." As described above, the carbon fiber baked substrate is subjected to a hydrophobic treatment as required, and in the present invention, the carbon fiber baked substrate having a hydrophobic treatment performed thereon is to also correspond to the "carbon sheet" (the carbon fiber baked substrate not having a hydrophobic treatment performed thereon naturally corresponds to the "carbon sheet").

<Formation of Microporous Layer>

In the method for producing a gas diffusion electrode substrate according to the present invention, the microporous layer can be formed by applying an MPL coating liquid containing a carbon powder and a dispersion medium onto at least one surface of the carbon sheet. The MPL coating liquid preferably contains a fluororesin.

The FIGURE shows a schematic sectional view of a production apparatus in the method for producing a gas diffusion electrode substrate according to the present invention. An MPL coating liquid 1 is delivered to a slit die coater by a metering pump and pushed out from a slit 3 of a die 2 to be applied onto a carbon sheet 4.

The MPL coating liquid may contain a dispersant such as a surfactant. As the dispersion medium, for example, water or an organic solvent can be used. Especially, the MPL coating liquid preferably contains water as the dispersion medium because rapid drying of the MPL coating liquid in an MPL application step sometimes induces microcracks on a surface of the microporous layer. As the dispersant, a nonionic surfactant is more preferably used. As the carbon powder, carbon black as described above is preferably used; however, the MPL coating liquid may contain various carbon powders other than carbon black.

In the present invention, the carbon powder in the MPL coating liquid and in the microporous layer needs to have a DBP oil absorption in the range of 70 to 155 ml/100 g. The carbon powder has a DBP oil absorption of more preferably 150 ml/100 g or less and further preferably 145 ml/100 g or less. The carbon powder also has a DBP oil absorption of more preferably 80 ml/100 g or more and further preferably 90 ml/100 g or more. A carbon powder having a DBP oil absorption of 70 ml/100 g or more, more preferably 80 ml/100 g or more, further preferably 90 ml/100 g or more improves the dispersibility thereof to give an MPL coating liquid high in storage stability. Further, a carbon powder having a DBP oil absorption of 70 ml/100 g or more, 80 ml/100 g or more, further preferably 90 ml/100 g or more increases the viscosity of the MPL coating liquid to suppress the infiltration of the MPL coating liquid into the carbon sheet in the MPL application step, reducing the surface roughness of the microporous layer. In addition, the infiltration of the MPL coating liquid into the carbon sheet is suppressed to increase the porosity of a carbon sheet portion in the gas diffusion electrode substrate, improving the gas diffusivity to improve the cell performance. A carbon powder having a DBP oil absorption of 155 ml/100 g or less, more preferably 150 ml/100 g or less, further preferably 145 ml/100 g or less decreases the secondary particle size of the carbon powder to reduce the surface roughness of the microporous layer. The DBP oil absorption can be increased by raising the impact rate of particles of a raw material at the time of producing the carbon powder. The DBP oil absorption of the carbon powder contained in the MPL coating liquid can be determined in accordance with JIS K 6217-4 (2008 amended version).

In the method for producing a gas diffusion electrode substrate according to the present invention, the carbon powder in the MPL coating liquid has an ash content of necessarily less than 0.10% by mass, more preferably less than 0.07% by mass, and further preferably less than 0.02% by mass. The ash content inhibits a catalyst reaction in a fuel cell, and therefore, a carbon powder having an ash content of less than 0.10% by mass, more preferably less than 0.07% by mass, further preferably less than 0.02% by mass improves the durability of a fuel cell that includes the gas diffusion electrode substrate of the present invention. In addition, a carbon powder having an ash content of less than 0.10% by mass, more preferably less than 0.07% by mass, further preferably less than 0.02% by mass reduces the volume specific resistance thereof to give a gas diffusion electrode substrate excellent in electrical conductivity. The ash content of the carbon powder contained in the MPL coating liquid can be determined in accordance with JIS K 6218-2 (2005 established version).

When the carbon powder contained in the MPL coating liquid has a DBP oil absorption of 70 to 155 ml/100 g, more preferably 80 to 150 ml/100 g, further preferably 90 to 145 ml/100 g and having an ash content of less than 0.1% by mass, more preferably less than 0.07% by mass, further preferably less than 0.02% by mass, the storage stability of the MPL coating liquid particularly increases.

Example of the method of reducing the ash content include selection of a raw material for producing the carbon powder, which contains a minimum amount of alkali metals such as sodium, potassium, and calcium, or alkaline-earth metals. Alternatively, the ash content can also be reduced by a method of washing the carbon powder with water or hydrochloric acid to remove a part of the ash content.

In the method for producing a gas diffusion electrode substrate according to the present invention, all the carbon powder(s) contained in 100% by mass of the MPL coating liquid is preferably in the range of 10 to 50% by mass. Here, "all the carbon powder(s)" represents, in a case of using one carbon powder, the percent (%) by mass of the carbon powder, and, in a case of using two or more carbon powders, the total percent (%) by mass of all the carbon powders. All the carbon powder(s) is more preferably 12% by mass or more and further preferably 14% by mass or more. All the carbon powder (s) is also preferably 45% by mass or less and further preferably 40% by mass or less. With all the carbon powder(s) being 10% by mass or more, more preferably 12% by mass or more, further preferably 14% by mass or more in 100% by mass of the MPL coating liquid, the viscosity of the MPL coating liquid appropriately increases to suppress the infiltration of the MPL coating liquid into the carbon sheet, increasing the gas diffusivity, so that a resultant gas diffusion electrode substrate becomes high in cell performance. In addition, with all the carbon powder(s) being 50% by mass or less, more preferably 45% by mass or less, further preferably 40% by mass or less in 100% by mass of the MPL coating liquid, the concentration of the MPL coating liquid decreases to reduce the variety in areal weight of the microporous layer even when the application amount of the MPL coating liquid is varied, giving a gas diffusion electrode substrate small in variety of the thickness.

In the method for producing a gas diffusion electrode substrate according to the present invention, the application of the MPL coating liquid onto at least one surface of the carbon sheet needs to be performed using a slit die coater. The use of the slit die coater can reduce the variety in the application amount of the MPL coating liquid to reduce the variety in thickness of the gas diffusion electrode substrate and to reduce the surface roughness of the microporous layer.

The microporous layer is preferably formed by a plurality of applications of the MPL coating liquid. A plurality of applications can more reduce the surface roughness of the microporous layer.

In the method for producing a gas diffusion electrode substrate according to the present invention, the slit die coater shown in The FIGURE needs to have a lip-tip length L of 0.10 to 10.00 mm, the MPL coating liquid needs to contain a carbon powder, and the carbon powder needs to have a DBP oil absorption of 70 to 155 ml/100 g and an ash content of less than 0.1% by mass.

The slit die coater has a lip-tip length of more preferably 0.30 mm or more and further preferably 0.50 mm or more. The slit die coater also has a lip-tip length of more preferably 8.00 mm or less and further preferably 6.00 mm or less. A slit die coater having a lip-tip length of 0.10 mm or more, more preferably 0.30 mm or more, further preferably 0.50 mm or more can form a stable liquid pool under a lip on an upstream side to improve the application stability of the MPL coating liquid. A slit die coater having a lip-tip length of 10.00 mm or less, more preferably 8.00 mm or less, further preferably 6.00 mm or less is unlikely to compress the MPL coating liquid with a lip-tip portion to suppress the infiltration of the MPL coating liquid into the carbon sheet.

Here, the lip-tip length of the slit die coater means the portions indicated by L in The FIGURE. The slit die coater has two lip-tips in a direction in which the carbon sheet flows, and it is important in the present invention that at least one of the two lip-tips has a length L of 0.10 to 10.00 mm. That is, as long as the slit die coater has at least one lip-tip having a length L of 0.10 to 10.00 mm, it does not matter if the other lip-tip either has a length L of 0.10 to 10.00 mm or is out of this range.

In the method for producing a gas diffusion electrode substrate according to the present invention, it is preferred that after the application of the MPL coating liquid onto the carbon sheet in the MPL application step, the MPL coating liquid-applied carbon sheet be retained horizontally for 1 second or more and 5 minutes or less, dried, and sintered, that is, after the application of the MPL coating liquid onto the carbon sheet, the carbon coating liquid-applied gas diffusion electrode substrate be retained horizontally for 1 second or more and 5 minutes or less before drying. That is, such a gas diffusion electrode substrate is retained so as to be horizontal. Here, the term "horizontal" means a state of a plane that can be kept horizontal to an extent not to allow the MPL coating liquid in the gas diffusion electrode substrate to move in the plane. Horizontal retention for 1 second or more levels the MPL coating liquid to reduce the surface roughness of a resultant gas diffusion electrode substrate. A retention time of 5 minutes or less suppresses the infiltration of the MPL coating liquid into the carbon sheet to give a gas diffusion electrode substrate high in gas diffusivity. A retention time of 5 minutes or less also improves the productivity of the gas diffusion electrode substrate.

In the method for producing a gas diffusion electrode substrate according to the present invention, the MPL coating liquid has, at a shear rate of 17 s$^{-1}$, a viscosity preferably in the range of 1.0 to 20.0 Pa·s, more preferably in the range of 2.0 to 17.0 Pa·s, and further preferably in the range of 3.0 to 15.0 Pa·s. The viscosity is measured by a shear rate and shear stress control type viscometer. By a temperature-adjusted viscometer so that the MPL coating liquid is adjusted to 23° C., the viscosity at a shear rate of 17 s$^{-1}$ is measured using a cone with a cone angle of 1 degree. As the shear rate and shear stress control type viscometer, the shear rate and shear stress control type rheometer RC30 manufacture by VISCOTECH CO., LTD. or its equivalent product can be used.

In the method for producing a gas diffusion electrode substrate according to the present invention, it is preferred that one surface of the carbon sheet have a covering rate of 70 to 90%, the other surface have a covering rate lower than the covering rate of the one surface by 5 to 20 points, and the MPL coating liquid be applied onto the one surface of the carbon sheet (surface having a larger covering rate) in the MPL application step.

With the carbon sheet having a covering rate of 70% or more on a surface onto which the MPL coating liquid is applied, the MPL coating liquid is less likely to infiltrate in the MPL application step to reduce the surface roughness of the microporous layer. Meanwhile, with the carbon sheet having a covering rate of 90% or less on a surface onto which the MPL coating liquid is applied, the gas penetrant diffusivity in the through-plane direction of the carbon sheet is further improved to more increase the gas diffusivity in the through-plane direction of a resultant gas diffusion electrode substrate, improving the cell performance at both high and low temperatures. In consideration of the balance between efficient water removal performance and efficient gas diffusivity, the carbon sheet preferably has a covering rate of 75.0% or more and 81.4% or less on the one surface.

The MPL coating liquid is preferably dried at a temperature of 80 to 150° C. after the application of the coating liquid onto the carbon sheet, to remove a dispersion medium. That is, the applied matter is placed in a dryer whose temperature is set at 80 to 150° C. and dried in the range of 5 to 30 minutes. The drying air volume may be properly decided, but rapid drying is not desirable because microcracks are sometimes induced on the surface of the microporous layer. As described above, solid contents in the MPL coating liquid (carbon powder, fluororesin, surfactant, etc.) are remained after the drying.

The dried applied matter is placed in a muffle furnace, a baking furnace or a high-temperature drying machine and heated at 300 to 380° C. for 1 to 20 minutes, preferably 5 to 20 minutes to melt the fluororesin, and sintering is performed with the melted fluororesin as a binder of particles of the carbon powder.

In a case of using a tetrafluoroethylene-hexa fluoro propylene copolymer (FEP) as the fluororesin in either the MPL application step or the hydrophobic treatment step, the temperature of a muffle furnace, a baking furnace or a high-temperature drying machine is preferably 370° C. or less. With the temperature set at 370° C. or less, the pyrolysis of the tetrafluoroethylene-hexa fluoro propylene copolymer (FEP) can be suppressed.

The microporous layer produced by the method for producing a gas diffusion electrode substrate according to the present invention preferably has a surface roughness of 3.0 to 7.0 μm. The microporous layer has a surface roughness of more preferably 6.0 μm or less and further preferably 5.0 μm or less. A microporous layer having a surface roughness of 7.0 μm or less, more preferably 6.0, further preferably 5.0 μm is less likely to damage an electrolyte membrane to improve the durability of the electrolyte membrane.

<Catalyst Application Step>

In the present invention, a gas diffusion electrode refers to one that is obtained by forming a catalyst layer on a surface of the microporous layer of the gas diffusion electrode substrate.

In a case of using the gas diffusion electrode substrate of the present invention for a fuel cell, a catalyst coating liquid is preferably applied onto a surface of the microporous layer. The catalyst coating liquid is applied onto the microporous layer, so that the adhesion is high between the microporous layer and the catalyst layer to increase the electrical conductivity.

The catalyst coating liquid preferably contains a solid polymer electrolyte, a carbon-supported catalyst, and a dispersion medium. As a catalyst, platinum is normally used. In a fuel cell in which a carbon monoxide-containing reformed gas is supplied to an anode side, platinum and ruthenium are preferably used as catalysts of the anode side. As the solid polymer electrolyte, a perfluorosulfonic acid-based polymer material is preferably used that has high protonic conductivity, high oxidation resistance, and high heat resistance.

<Membrane Electrode Assembled Body>

The gas diffusion electrode is joined with at least one surface of a solid polymer electrolyte membrane, with a catalyst layer side of the gas diffusion electrode directed to the solid polymer electrolyte membrane side, to constitute a membrane electrode assembled body.

19

<Fuel Cell>

A fuel cell of the present invention includes a bipolar plate on both sides of the membrane assembled body. That is, the membrane electrode assembled body and the bipolar plate on both sides of the assembled body constitute the fuel cell. Normally, a plurality of built-up bodies are stacked, each of which is obtained by sandwiching such a membrane electrode assembled body between bipolar plates on both sides, with a gasket interposed between the membrane electrode assembled body and each of the bipolar plates, to constitute a polymer electrolyte fuel cell. Such a fuel cell unit and the configuration of a fuel cell themselves are well known.

EXAMPLES

Hereinafter, the present invention is specifically described by way of examples. Described below are materials, a carbon sheet, a gas diffusion electrode substrate, a method for preparing a gas diffusion electrode, and a battery performance evaluation method of a fuel cell that are used in the examples.

<Preparation of Carbon Sheet>

The polyacrylonitrile-based carbon fiber "TORAYCA" (registered trademark) T300 (mean carbon fiber diameter: 7 µm) manufactured by Toray Industries, Inc. were cut at a mean length of 12 mm and dispersed in water to continuously make paper by a wet papermaking method. Further, a 10% by mass aqueous solution of polyvinyl alcohol was applied onto the paper as a binder and dried to prepare a papermaking substrate having a carbon fiber areal weight of 30 g/m$^2$. The application amount of polyvinyl alcohol was 22 parts by mass relative to 100 parts by mass of the papermaking substrate.

Using a resin obtained by mixing a resol type phenolic resin and a novolak type phenolic resin at 1:1 by mass ratio as a thermosetting resin, flaky graphite (mean particle size 5 µm) as a carbon powder, and methanol as a solvent, the materials were mixed at an addition ratio of thermosetting resin/carbon powder/solvent=10 parts by mass/5 parts by mass/85 parts by mass, and the resulting mixture was stirred for 1 minute using an ultrasonic dispersion apparatus to give a uniformly dispersed resin composition.

A papermaking substrate cut in 15 cm×12.5 cm was dipped into the resin composition filling an aluminum tray and then squeezed by sandwiching the papermaking substrate between horizontally disposed two rolls. At this time, the loading amount of resin components on the carbon fiber papermaking substrate was adjusted by changing the clearance between the horizontally disposed two rolls. After the impregnation, the papermaking substrate was heated for drying at 100° C. for 5 minutes to prepare a prepreg. Next, the prepreg was annealed at 180° C. for 5 minutes while being pressurized by a pressing machine with flat plates. At the time of the pressurization, a spacer was disposed in the pressing machine to adjust the gap between the upper and lower counter plates.

A substrate obtained by annealing the prepreg was introduced into a heating furnace maintaining a nitrogen gas atmosphere and having a highest temperature of 2400° C., to give a carbon sheet formed of a carbon fiber baked substrate.

PTFE was imparted in an amount of 5 parts by mass relative to 95 parts by mass of the carbon fiber baked substrate, and the PTFE-imparted baked substrate was heated for drying at 100° C. for 5 minutes to prepare a carbon sheet with a thickness of 150 µm and an areal weight of 46 g/m$^2$.

20

<Formation of Microporous Layer>

Using a slit die coater having a lip-tip length shown in tables, an MPL coating liquid was applied onto a surface of the carbon sheet to form a microporous layer. The used slit die coater had lip-tip lengths that are the same on upstream and downstream sides. The MPL coating liquid used here was obtained by using acetylene black as a carbon powder, which had a DBP oil absorption and an ash content that are shown in the tables, PTFE ("POLYFLON" (registered trademark) D-1E manufactured by Daikin Industries, Ltd.) as fluororesin, a surfactant ("TRITON" (registered trademark) X-100 manufactured by Nacalai Tesque, Inc.), and purified water as a dispersion medium, and by adjusting the addition amounts of the materials so that the MPL coating liquid would have composition shown in the tables that indicate the addition amounts by part by mass. The addition amount of PTFE shown in the tables represents an addition amount of a water dispersion liquid of PTFE. The MPL coating liquid was applied onto the carbon sheet and then heated (sintered) at 100° C. for 10 minutes and at 380° C. for 10 minutes to prepare a gas diffusion electrode substrate. The delivery amount of the MPL coating liquid was adjusted by a metering pump so that the microporous layer would have an areal weight of 18 g/m$^2$.

<Formation of Catalyst Layer>

Using a slit die coater, a catalyst layer was formed on a surface of the microporous layer of the gas diffusion electrode substrate. A catalyst coating liquid used here was prepared by sequentially adding 1.00 g of a carbon-supported platinum (manufactured by Tanaka Kikinzoku Kogyo K.K., platinum supporting amount: 50% by mass), 1.00 g of purified water, 8.00 g of a "NAFION" (registered trademark) solution (manufactured by Sigma-Aldrich Co. LLC., "NAFION" (registered trademark), 5.0% by mass), and 18.00 g of isopropyl alcohol (manufactured by Nacalai Tesque, Inc.), and by dispersing the materials by a disperser. The catalyst coating liquid was applied onto the surface of the microporous layer using a slit die coater and then heated at 100° C. for 10 minutes to prepare a gas diffusion electrode. The amount applied by the slit die coater was adjusted so that the catalyst layer would have an areal weight of 5 g/m$^2$.

<Evaluation on Cell performance of Polymer Electrolyte Fuel Cell>

The solid polymer electrolyte membrane "NAFION" (registered trademark) NRE-211CS (manufactured by E. I. du Pont de Nemours and Company) cut in 10 cm×10 cm was sandwiched between two gas diffusion electrodes each cut in 5 cm×5 cm, with a catalyst layer side of each of the gas diffusion electrodes directed to the solid polymer electrolyte membrane, and was pressed by a pressing machine with flat plates at a pressure of 3 MPa and at 130° C. for 5 minutes to prepare a membrane electrode assembled body.

The resultant membrane electrode assembled body was incorporated into a unit cell for fuel cell evaluation, and the voltage was measured when the current density was changed. Here, used as a bipolar plate was a serpentine-type bipolar plate having one flow channel of 1.0 mm in channel width, 1.0 mm in channel depth, and 1.0 mm in rib width. The evaluation was carried out with non-pressurized hydrogen and non-pressurized air being supplied to an anode side and a cathode side, respectively. The evaluation was carried out while hydrogen and air were both humidified by a humidification pot to keep the relative humidity at 100%. The utilization ratios of hydrogen and atmospheric oxygen were set at 70 mol % and 40 mol %, respectively. The output voltage was measured at a setting of an operation temperature of 40° C., a relative humidity of 100%, and a current density of 1.5 A/cm², and the measured value was used as an index of cell performance.

<Measurement of Areal Weight (W) of Microporous Layer>

The areal weights of the carbon sheet and the gas diffusion electrode substrate were determined by dividing the mass of a sample cut in a 10-cm square by the area of the sample (0.01 m²). The difference in areal weight between the gas diffusion electrode substrate and the carbon sheet was defined as the areal weight (W) of the microporous layer.

<Measurement of Thickness (L) of Microporous Layer and Measurement of Thickness Variation of Gas Diffusion Electrode Substrate>

The carbon sheet and the gas diffusion electrode substrate were each placed on a smooth surface plate, and the difference in height was measured at a pressure of 0.15 MPa between when the object to be measured was present and when the object to be measured was not present. Different 10 parts were sampled, and the average of the measured values of difference in height was defined as a thickness. The difference in thickness between the gas diffusion electrode substrate and the carbon sheet was defined as the thickness (L) of the microporous layer.

The variety in thickness of the gas diffusion electrode substrate was determined by calculating the standard deviation in thickness of the 10 parts.

<Measurement of Surface Roughness>

The surface roughness of the microporous layer was determined by depth distribution measurement for the surface of the microporous layer using a surface analysis laser microscope. Used as an apparatus was the laser microscope VK-X100 manufactured by KEYENCE CORPORATION with an objective lens having a magnification of 10 times.

First, the gas diffusion electrode substrate was fixed onto a surface plate, with the microporous layer kept upward, not floated, and creaseless, and then, a surface in the range of 5 sq. mm of the microporous layer was measured for the depth distribution using the laser microscope. The arithmetic average roughness was determined from data obtained by subjecting the depth distribution to plane automatic inclination correction. The measurement was performed for randomly selected 10 points on the surface of the microporous layer, and the average value of arithmetic average roughness at the 10 points was defined as the surface roughness.

Example 1

A gas diffusion electrode substrate was obtained according to the methods described in <Preparation of Carbon Sheet> and <Formation of Microporous Layer> above and by applying an MPL coating liquid having the composition shown in Table 1. Further, the catalyst coating liquid was applied according to the method described in <Formation of Catalyst Layer> to give a gas diffusion electrode. As a result of evaluating the gas diffusion electrode substrate, the surface roughness was excellent as described in Table 1. The flooding resistance was also excellent as described in Table 1.

TABLE 1

|  |  | Example 1 | Example 2 | Example 3 | Example 4 | Example 5 | Example 6 |
|---|---|---|---|---|---|---|---|
| Carbon sheet | Covering rate [%] of one surface | 74 | 74 | 74 | 74 | 74 | 74 |
|  | Covering rate [%] of other surface | 74 | 74 | 74 | 74 | 74 | 74 |
|  | Difference in covering rate [point] | 0 | 0 | 0 | 0 | 0 | 0 |
| Composition of MPL coating solution | Carbon powder [part by mass] | 11.0 | 11.0 | 11.0 | 11.0 | 11.0 | 11.0 |
|  | Fluororesin [part by mass] | 6.0 | 6.0 | 6.0 | 6.0 | 6.0 | 6.0 |
|  | Surfactant [part by mass] | 22.0 | 22.0 | 22.0 | 22.0 | 22.0 | 22.0 |
|  | Purified water [part by mass] | 61.0 | 61.0 | 61.0 | 61.0 | 61.0 | 61.0 |
| Production method of gas diffusion electrode substrate | Application method | Slit die | Slit die | Slit die | Slit die | Slit die | Slit die |
|  | Lip-tip length [mm] | 5.00 | 5.00 | 5.00 | 5.00 | 5.00 | 5.00 |
|  | Viscosity of MPL coating solution [Pa · s] | 0.9 | 1.5 | 2.5 | 3.5 | 1.9 | 2.9 |
|  | MPL coating solution application surface | One surface | One surface | One surface | One surface | One surface | One surface |
|  | Retention time [s] | 350 | 2 | 4 | 350 | 2 | 350 |
| Gas diffusion electrode substrate | Ash content in carbon powder [% by mass] | 0.01 | 0.01 | 0.01 | 0.01 | 0.08 | 0.05 |
|  | DBP oil absorption of carbon powder [ml/100 g] | 75 | 85 | 147 | 152 | 130 | 130 |
|  | Areal weight (W) of microporous layer [g/m²] | 18 | 18 | 18 | 18 | 18 | 18 |
|  | Thickness (L) of microporous layer [μm] | 21 | 22 | 23 | 21 | 22 | 23 |
|  | Infiltration index (L/W) | 1.17 | 1.22 | 1.28 | 1.17 | 1.22 | 1.28 |
|  | Variety in thickness [μm] | 9.8 | 9.4 | 8.4 | 9.8 | 9.5 | 9.8 |
|  | Surface roughness [μm] | 6.8 | 6.6 | 6.5 | 6.8 | 6.7 | 6.8 |
|  | Peak size of pore [μm] | 0.08 | 0.09 | 0.18 | 0.19 | 0.16 | 0.15 |
| Flooding resistance | Output voltage [V] | 0.33 | 0.36 | 0.38 | 0.33 | 0.36 | 0.33 |

Example 2

A gas diffusion electrode substrate was obtained according to the methods described in <Preparation of Carbon Sheet> and <Formation of Microporous Layer> above and by applying an MPL coating liquid having the composition shown in Table 1. Further, the catalyst coating liquid was applied according to the method described in <Formation of Catalyst Layer> to give a gas diffusion electrode. As a result of evaluating the gas diffusion electrode substrate, the surface roughness was excellent as described in Table 1. The flooding resistance was also excellent as described in Table 1.

Example 3

A gas diffusion electrode substrate was obtained according to the methods described in <Preparation of Carbon Sheet> and <Formation of Microporous Layer> above and by applying an MPL coating liquid having the composition shown in Table 1. Further, the catalyst coating liquid was applied according to the method described in <Formation of Catalyst Layer> to give a gas diffusion electrode. As a result of evaluating the gas diffusion electrode substrate, the surface roughness was excellent as described in Table 1. The flooding resistance was remarkably excellent as described in Table 1.

Example 4

A gas diffusion electrode substrate was obtained according to the methods described in <Preparation of Carbon Sheet> and <Formation of Microporous Layer> above and by applying an MPL coating liquid having the composition shown in Table 1. Further, the catalyst coating liquid was applied according to the method described in <Formation of Catalyst Layer> to give a gas diffusion electrode. As a result of evaluating the gas diffusion electrode substrate, the surface roughness was excellent as described in Table 1. The flooding resistance was also excellent as described in Table 1.

Example 5

A gas diffusion electrode substrate was obtained according to the methods described in <Preparation of Carbon Sheet> and <Formation of Microporous Layer> above and by applying an MPL coating liquid having the composition shown in Table 1. Further, the catalyst coating liquid was applied according to the method described in <Formation of Catalyst Layer> to give a gas diffusion electrode. As a result of evaluating the gas diffusion electrode substrate, the surface roughness was excellent as described in Table 1. The flooding resistance was also excellent as described in Table 1.

Example 6

A gas diffusion electrode substrate was obtained according to the methods described in <Preparation of Carbon Sheet> and <Formation of Microporous Layer> above and by applying an MPL coating liquid having the composition shown in Table 1. Further, the catalyst coating liquid was applied according to the method described in <Formation of Catalyst Layer> to give a gas diffusion electrode. As a result of evaluating the gas diffusion electrode substrate, the surface roughness was excellent as described in Table 1. The flooding resistance was also excellent as described in Table 1.

Example 7

A gas diffusion electrode substrate was obtained according to the methods described in <Preparation of Carbon Sheet> and <Formation of Microporous Layer> above and by applying an MPL coating liquid having the composition shown in Table 2. Further, the catalyst coating liquid was applied according to the method described in <Formation of Catalyst Layer> to give a gas diffusion electrode. As a result of evaluating the gas diffusion electrode substrate, the surface roughness was excellent as described in Table 2. The flooding resistance was remarkably excellent as described in Table 2.

TABLE 2

| | | Example 7 | Example 8 | Example 9 | Example 10 | Example 11 | Comparative Example 1 |
|---|---|---|---|---|---|---|---|
| Carbon sheet | Covering rate [%] of one surface | 74 | 79 | 74 | 79 | 79 | 74 |
| | Covering rate [%] of other surface | 74 | 69 | 74 | 69 | 69 | 74 |
| | Difference in covering rate [point] | 0 | 10 | 0 | 10 | 10 | 0 |
| Composition of MPL coating solution | Carbon powder [part by mass] | 11.0 | 11.0 | 11.0 | 11.0 | 11.0 | 11.0 |
| | Fluororesin [part by mass] | 6.0 | 6.0 | 6.0 | 6.0 | 6.0 | 6.0 |
| | Surfactant [part by mass] | 22.0 | 22.0 | 22.0 | 22.0 | 22.0 | 22.0 |
| | Purified water [part by mass] | 61.0 | 61.0 | 61.0 | 61.0 | 61.0 | 61.0 |
| Production method of gas diffusion electrode substrate | Application method | Slit die | Slit die | Slit die | Slit die | Slit die | Slit die |
| | Lip-tip length [mm] | 0.20 | 0.40 | 9.00 | 7.00 | 4.00 | 4.00 |
| | Viscosity of MPL coating solution [Pa·s] | 9.0 | 9.0 | 9.0 | 9.0 | 9.0 | 25.0 |
| | MPL coating solution application surface | One surface | One surface | One surface | One surface | One surface | One surface |
| | Retention time [s] | 70 | 10 | 4 | 10 | 10 | 10 |
| Gas diffusion electrode substrate | Ash content in carbon powder [% by mass] | 0.01 | 0.01 | 0.01 | 0.01 | 0.01 | 0.01 |
| | DBP oil absorption of carbon powder [ml/100 g] | 130 | 130 | 130 | 130 | 130 | 160 |
| | Areal weight (W) of microporous layer [g/m$^2$] | 18 | 18 | 18 | 18 | 18 | 18 |
| | Thickness (L) of microporous layer [μm] | 25 | 25 | 23 | 25 | 30 | 25 |
| | Infiltration index (L/W) | 1.39 | 1.39 | 1.28 | 1.39 | 1.67 | 1.39 |
| | Variety in thickness [μm] | 8.5 | 5.9 | 8.6 | 6.1 | 5.8 | 10.1 |
| | Surface roughness [μm] | 6.5 | 5.5 | 6.5 | 5.5 | 4.0 | 8.0 |
| | Peak size of pore [μm] | 0.15 | 0.16 | 0.16 | 0.15 | 0.16 | 0.21 |
| Flooding resistance | Output voltage [V] | 0.38 | 0.42 | 0.38 | 0.42 | 0.45 | — | by applying an MPL coating liquid having the composition shown in Table 1. Further, the catalyst coating liquid was applied according to the method described in <Formation of Catalyst Layer> to give a gas diffusion electrode. As a result

Example 8

A gas diffusion electrode substrate was obtained according to the methods described in <Preparation of Carbon Sheet> and <Formation of Microporous Layer> above and by applying an MPL coating liquid having the composition shown in Table 2. At this time, used as one of two squeeze rolls was a smooth metal roll having a structure capable of removing an excessive resin with a doctor blade, and as the other roll was a roll configured to be a so-called gravure roll having projections and recesses. The carbon fiber papermaking substrate was sandwiched between the metal roll on one surface side and the gravure roll on the other surface side to squeeze the impregnation liquid of the resin composition, differentiating the loading amount of the resin components on the one surface from the other surface of the carbon fiber papermaking substrate. The doctor blade was attached to the squeeze roll in contact with the other surface of the carbon sheet to remove the resin composition more from the other surface, so that a carbon sheet was obtained that had a difference in the covering rate between the one surface and the other surface of the carbon sheet. Further, the catalyst coating liquid was applied according to the method described in <Formation of Catalyst Layer> to give a gas diffusion electrode. As a result of evaluating the gas diffusion electrode substrate, the surface roughness was remarkably excellent as described in Table 2. The flooding resistance was also remarkably excellent as described in Table 2.

Example 9

A gas diffusion electrode substrate was obtained according to the methods described in <Preparation of Carbon Sheet> and <Formation of Microporous Layer> above and by applying an MPL coating liquid having the composition shown in Table 2. Further, the catalyst coating liquid was applied according to the method described in <Formation of Catalyst Layer> to give a gas diffusion electrode. As a result of evaluating the gas diffusion electrode substrate, the surface roughness was excellent as described in Table 2. The flooding resistance was also remarkably excellent as described in Table 2.

Example 10

A gas diffusion electrode substrate was obtained according to the methods described in <Preparation of Carbon Sheet> and <Formation of Microporous Layer> above and by applying an MPL coating liquid having the composition shown in Table 2. At this time, used as one of two squeeze rolls was a smooth metal roll having a structure capable of removing an excessive resin with a doctor blade, and as the other roll was a roll configured to be a so-called gravure roll having projections and recesses. The carbon fiber papermaking substrate was sandwiched between the metal roll on one surface side and the gravure roll on the other surface side to squeeze the impregnation liquid of the resin composition, differentiating the loading amount of the resin components on the one surface from the other surface of the carbon fiber papermaking substrate. The doctor blade was attached to the squeeze roll in contact with the other surface of the carbon sheet to remove the resin composition more from the other surface, so that a carbon sheet was obtained that had a difference in the covering rate between the one surface and the other surface of the carbon sheet. Further, the catalyst coating liquid was applied according to the method described in <Formation of Catalyst Layer> to give a gas diffusion electrode. As a result of evaluating the gas diffusion electrode substrate, the surface roughness was remarkably excellent as described in Table 2. The flooding resistance was also remarkably excellent as described in Table 2.

Example 11

A gas diffusion electrode substrate was obtained according to the methods described in <Preparation of Carbon Sheet> and <Formation of Microporous Layer> above and by applying an MPL coating liquid having the composition shown in Table 2. At this time, used as one of two squeeze rolls was a smooth metal roll having a structure capable of removing an excessive resin with a doctor blade, and as the other roll was a roll configured to be a so-called gravure roll having projections and recesses. The carbon fiber papermaking substrate was sandwiched between the metal roll on one surface side and the gravure roll on the other surface side to squeeze the impregnation liquid of the resin composition, differentiating the loading amount of the resin components on the one surface from the other surface of the carbon fiber papermaking substrate. The doctor blade was attached to the squeeze roll in contact with the other surface of the carbon sheet to remove the resin composition more from the other surface, so that a carbon sheet was obtained that had a difference in the covering rate between the one surface and the other surface of the carbon sheet. Further, the catalyst coating liquid was applied according to the method described in <Formation of Catalyst Layer> to give a gas diffusion electrode. As a result of evaluating the gas diffusion electrode substrate, the surface roughness was remarkably excellent as described in Table 2. The flooding resistance was also remarkably excellent as described in Table 2.

Comparative Example 1

A gas diffusion electrode substrate was obtained according to the methods described in <Preparation of Carbon Sheet> and <Formation of Microporous Layer> above and by applying an MPL coating liquid having the composition shown in Table 2. Further, the catalyst coating liquid was applied according to the method described in <Formation of Catalyst Layer> to give a gas diffusion electrode. As a result of evaluating the gas diffusion electrode substrate, the surface roughness was large and insufficient as described in Table 2. The flooding resistance was also insufficient as described in Table 2, so that electric power could not be generated.

Comparative Example 2

A gas diffusion electrode substrate was obtained according to the methods described in <Preparation of Carbon Sheet> and <Formation of Microporous Layer> above and by applying an MPL coating liquid having the composition shown in Table 3. Further, the catalyst coating liquid was applied according to the method described in <Formation of Catalyst Layer> to give a gas diffusion electrode. As a result of evaluating the gas diffusion electrode substrate, the surface roughness was remarkably large and insufficient as described in Table 3. The flooding resistance was also insufficient as described in Table 3, so that electric power could not be generated.

TABLE 3

| | | Comparative Example 2 | Comparative Example 3 | Comparative Example 4 | Comparative Example 5 | Comparative Example 6 | Comparative Example 7 |
|---|---|---|---|---|---|---|---|
| Carbon sheet | Covering rate [%] of one surface | 74 | 74 | 74 | 74 | 74 | 74 |
| | Covering rate [%] of other surface | 74 | 74 | 74 | 74 | 74 | 74 |
| | Difference in covering rate [point] | 0 | 0 | 0 | 0 | 0 | 0 |
| Composition of MPL coating solution | Carbon powder [part by mass] | 11.0 | 11.0 | 11.0 | 11.0 | 11.0 | 11.0 |
| | Fluororesin [part by mass] | 6.0 | 6.0 | 6.0 | 6.0 | 6.0 | 6.0 |
| | Surfactant [part by mass] | 22.0 | 22.0 | 22.0 | 22.0 | 22.0 | 22.0 |
| | Purified water [part by mass] | 61.0 | 61.0 | 61.0 | 61.0 | 61.0 | 61.0 |
| Production method of gas diffusion electrode substrate | Application method | Slit die | Slit die | Gravure | Spray | Slit die | Slit die |
| | Lip-tip length [mm] | 4.00 | 4.00 | — | — | 12.00 | 0.05 |
| | Viscosity of MPL coating solution [Pa·s] | 0.1 | 0.1 | 9.0 | 9.0 | 9.0 | 9.0 |
| | MPL coating solution application surface | One surface | One surface | One surface | One surface | One surface | One surface |
| | Retention time [s] | 10 | 10 | 10 | 10 | 10 | 10 |
| Gas diffusion electrode substrate | Ash content in carbon powder [% by mass] | 0.01 | 0.12 | 0.01 | 0.01 | 0.01 | 0.01 |
| | DBP oil absorption of carbon powder [ml/100 g] | 65 | 130 | 130 | 130 | 130 | 130 |
| | Areal weight (W) of microporous layer [g/m$^2$] | 18 | 18 | 18 | 18 | 18 | 18 |
| | Thickness (L) of microporous layer [μm] | 5 | 5 | 9 | 5 | 5 | — |
| | Infiltration index (L/W) | 0.28 | 0.28 | 0.50 | 0.28 | 0.28 | — |
| | Variety in thickness [μm] | 12 | 12 | 13.5 | 16 | 12 | — |
| | Surface roughness [μm] | 13.0 | 13.0 | 8.0 | 14.0 | 13.0 | — |
| | Peak size of pore [μm] | 0.07 | 0.15 | 0.16 | 0.15 | 0.16 | — |
| Flooding resistance | Output voltage [V] | — | — | — | — | — | — |

Comparative Example 3

A gas diffusion electrode substrate was obtained according to the methods described in <Preparation of Carbon Sheet> and <Formation of Microporous Layer> above and by applying an MPL coating liquid having the composition shown in Table 3. Further, the catalyst coating liquid was applied according to the method described in <Formation of Catalyst Layer> to give a gas diffusion electrode. As a result of evaluating the gas diffusion electrode substrate, the surface roughness was remarkably large and insufficient as described in Table 3. The flooding resistance was also insufficient as described in Table 3, so that electric power could not be generated.

Comparative Example 4

A gas diffusion electrode substrate was obtained according to the methods described in <Preparation of Carbon Sheet> and <Formation of Microporous Layer> above and by applying an MPL coating liquid having the composition shown in Table 3, except that the application method was changed to gravure printing. Further, the catalyst coating liquid was applied according to the method described in <Formation of Catalyst Layer> to give a gas diffusion electrode. As a result of evaluating the gas diffusion electrode substrate, the surface roughness was remarkably large and insufficient as described in Table 3. The flooding resistance was also insufficient as described in Table 3, so that electric power could not be generated.

Comparative Example 5

A gas diffusion electrode substrate was obtained according to the methods described in <Preparation of Carbon Sheet> and <Formation of Microporous Layer> above and by applying an MPL coating liquid having the composition shown in Table 3, except that the application method was changed to spray painting. Further, the catalyst coating liquid was applied according to the method described in <Formation of Catalyst Layer> to give a gas diffusion electrode. As a result of evaluating the gas diffusion electrode substrate, the surface roughness was remarkably large and insufficient as described in Table 3. The flooding resistance was also insufficient as described in Table 3, so that electric power could not be generated.

Comparative Example 6

A gas diffusion electrode substrate was obtained according to the methods described in <Preparation of Carbon Sheet> and <Formation of Microporous Layer> above and by applying an MPL coating liquid having the composition shown in Table 3. Further, the catalyst coating liquid was applied according to the method described in <Formation of Catalyst Layer> to give a gas diffusion electrode. As a result of evaluating the gas diffusion electrode substrate, the surface roughness was remarkably large and insufficient as described in Table 3. The flooding resistance was also insufficient as described in Table 3, so that electric power could not be generated.

Comparative Example 7

A gas diffusion electrode substrate was obtained according to the methods described in <Preparation of Carbon Sheet> and <Formation of Microporous Layer> above and by applying an MPL coating liquid having the composition shown in Table 3. Further, the catalyst coating liquid was applied according to the method described in <Formation of Catalyst Layer> to give a gas diffusion electrode. The gas diffusion electrode substrate had loading unevenness of the microporous layer, and the flooding resistance was insufficient as described in Table 3, so that electric power could not be generated.

DESCRIPTION OF REFERENCE SIGNS

1: MPL coating liquid
2: Die
3: Slit
4: Carbon sheet
L: Lip-tip length

The invention claimed is:

1. A method for producing a gas diffusion electrode substrate including a carbon sheet and a microporous layer, wherein the carbon sheet is porous, the method comprises an application step of applying a coating liquid for forming the microporous layer (hereinafter, described as an MPL coating liquid) onto at least one surface of the carbon sheet by a slit die coater (hereinafter, described as an MPL application step), the slit die coater has a lip-tip length of 0.10 to 10.00 mm, and the MPL coating liquid contains a carbon powder having a DBP oil absorption of 70 to 155 ml/100 g and an ash content of less than 0.10% by mass, and contains a dispersion medium.

2. The method for producing a gas diffusion electrode substrate according to claim 1, wherein the MPL coating liquid has a viscosity of 1.0 to 20.0 Pa·s at a shear rate of 17 $s^{-1}$.

3. The method for producing a gas diffusion electrode substrate according to claim 1, wherein after the application of the MPL coating liquid in the MPL application step, the MPL coating liquid-applied carbon sheet is retained horizontally for 1 second or more and 5 minutes or less, and subsequently, the carbon sheet is dried and sintered.

4. The method for producing a gas diffusion electrode substrate according to claim 1, comprising water as the dispersion medium.

5. The method for producing a gas diffusion electrode substrate according to claim 1, wherein all carbon powder(s) contained in 100% by mass of the MPL coating liquid is 10 to 50% by mass.

6. The method for producing a gas diffusion electrode substrate according to claim 1, wherein one surface of the carbon sheet has a covering rate of 70 to 90%, the other surface has a covering rate lower than the covering rate of the one surface by 5 to 20 points, and the MPL coating liquid is applied onto the one surface of the carbon sheet in the MPL application step.

* * * * *